United States Patent
Newel et al.

(10) Patent No.: US 11,940,186 B2
(45) Date of Patent: *Mar. 26, 2024

(54) $CO_2$ REFRIGERATION SYSTEM WITH MAGNETIC REFRIGERATION SYSTEM COOLING

(71) Applicant: Hill Phoenix, Inc., Conyers, GA (US)

(72) Inventors: Jeffrey E. Newel, Snellville, GA (US); John D. Bittner, Conyers, GA (US); Niel M. Hayes, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,512

(22) Filed: Jul. 25, 2022

(65) Prior Publication Data
US 2022/0357081 A1  Nov. 10, 2022

Related U.S. Application Data

(62) Division of application No. 16/421,819, filed on May 24, 2019, now Pat. No. 11,397,032.
(Continued)

(51) Int. Cl.
*F25B 25/00* (2006.01)
*F25B 9/00* (2006.01)
(Continued)

(52) U.S. Cl.
CPC .............. *F25B 25/00* (2013.01); *F25B 9/008* (2013.01); *F25B 21/00* (2013.01); *F25B 41/40* (2021.01);
(Continued)

(58) Field of Classification Search
CPC ........ F25B 25/00; F25B 25/005; F25B 9/008; F25B 21/00; F25B 41/00; F25B 2321/002;
(Continued)

(56) References Cited

U.S. PATENT DOCUMENTS

| 4,270,363 A | 6/1981 | Maring et al. |
|---|---|---|
| 4,589,263 A | 5/1986 | Dicarlo et al. |

(Continued)

FOREIGN PATENT DOCUMENTS

| EP | 1789732 | 5/2007 |
|---|---|---|
| EP | 1848933 | 12/2010 |

(Continued)

OTHER PUBLICATIONS

Co2oltec, A world first in technology: Refrigeration with CO2, special print from KK Die Kalte & Klimatechnik, Edition Feb. 2005, 15 pages.

(Continued)

*Primary Examiner* — Joseph F Trpisovsky
(74) *Attorney, Agent, or Firm* — Fish & Richardson P.C.

(57) ABSTRACT

A refrigeration system includes a refrigeration circuit and a coolant circuit separate from the refrigeration circuit. The refrigerant circuit includes a gas cooler/condenser, a receiver, and an evaporator. The coolant circuit includes a heat exchanger configured to transfer heat from a refrigerant circulating within the refrigeration circuit into a coolant circulating within the coolant circuit, a heat sink configured to remove heat from the coolant circulating within the coolant circuit, and a magnetocaloric conditioning unit configured to transfer heat from the coolant within a first fluid conduit of the coolant circuit into the coolant within a second fluid conduit of the coolant circuit. The first fluid conduit connects an outlet of the heat exchanger to an inlet of the heat sink, whereas the second fluid conduit connects an outlet of the heat sink to an inlet of the heat exchanger.

20 Claims, 7 Drawing Sheets

Related U.S. Application Data

(60) Provisional application No. 62/680,879, filed on Jun. 5, 2018.

(51) Int. Cl.
*F25B 21/00* (2006.01)
*F25B 41/40* (2021.01)

(52) U.S. Cl.
CPC . *F25B 2321/002* (2013.01); *F25B 2400/0403* (2013.01); *F25B 2400/05* (2013.01); *F25B 2500/09* (2013.01); *F25B 2500/18* (2013.01); *F25B 2600/2501* (2013.01); *F25B 2600/2513* (2013.01); *F25B 2600/2515* (2013.01)

(58) Field of Classification Search
CPC .......... F25B 2400/0403; F25B 2400/05; F25B 2400/16; F25B 2500/09; F25B 2500/18; F25B 2600/2501; F25B 2600/2513; F25B 2600/2515
See application file for complete search history.

(56) References Cited

U.S. PATENT DOCUMENTS

| | | | |
|---|---|---|---|
| 5,425,246 A | 6/1995 | Bessler | |
| 5,539,382 A | 7/1996 | Duff et al. | |
| 6,205,812 B1 | 3/2001 | Acharya et al. | |
| 6,293,106 B1 | 9/2001 | Acharya et al. | |
| 6,385,980 B1 | 5/2002 | Sienel | |
| 6,415,611 B1 | 7/2002 | Acharya et al. | |
| 6,418,735 B1 | 7/2002 | Sienel | |
| 6,425,250 B1 * | 7/2002 | Acharya | F25B 9/145 62/434 |
| 7,065,979 B2 | 6/2006 | Arshansky et al. | |
| 7,406,837 B2 | 8/2008 | Nemoto et al. | |
| 7,913,506 B2 | 3/2011 | Bittner et al. | |
| 8,011,192 B2 | 9/2011 | Gupte | |
| 8,511,103 B2 | 8/2013 | Welch | |
| 8,631,666 B2 | 1/2014 | Hinde et al. | |
| 8,756,947 B2 | 6/2014 | Chen et al. | |
| 8,966,934 B2 | 3/2015 | Christensen | |
| 9,121,631 B2 | 9/2015 | Cho et al. | |
| 9,151,521 B2 | 10/2015 | Bittner | |
| 9,335,079 B2 | 5/2016 | Huff et al. | |
| 9,353,980 B2 | 5/2016 | Ignatiev | |
| 9,395,112 B2 | 7/2016 | Prins | |
| 9,470,435 B2 | 10/2016 | Hinde et al. | |
| 9,541,311 B2 | 1/2017 | Hinde et al. | |
| 9,625,183 B2 | 4/2017 | Wallace et al. | |
| 9,657,977 B2 | 5/2017 | Hinde et al. | |
| 9,664,424 B2 | 5/2017 | Hinde et al. | |
| 9,689,590 B2 | 6/2017 | Christensen | |
| 9,920,963 B1 | 3/2018 | Rafalovich et al. | |
| 10,677,500 B2 | 6/2020 | Kim | |
| 11,397,032 B2 | 7/2022 | Newel et al. | |
| 2003/0182961 A1 | 10/2003 | Nishida et al. | |
| 2005/0011221 A1 | 1/2005 | Hirota | |
| 2005/0178150 A1 | 8/2005 | Oshitani et al. | |
| 2005/0217278 A1 | 10/2005 | Mongia et al. | |
| 2005/0268625 A1 | 12/2005 | Sienel et al. | |
| 2007/0199337 A1 | 8/2007 | Otake et al. | |
| 2007/0240428 A1 | 10/2007 | Koga et al. | |
| 2008/0006044 A1 | 1/2008 | Tan | |
| 2008/0098754 A1 | 5/2008 | Sommer et al. | |
| 2008/0196420 A1 | 8/2008 | Gernemann | |
| 2008/0264077 A1 | 10/2008 | Heinbokel et al. | |
| 2010/0000245 A1 | 1/2010 | Kasahara et al. | |
| 2010/0199707 A1 | 8/2010 | Pearson | |
| 2010/0263393 A1 | 10/2010 | Chen et al. | |
| 2011/0036110 A1 | 2/2011 | Fujimoto et al. | |
| 2011/0041527 A1 | 2/2011 | Jakobsen et al. | |
| 2011/0162397 A1 | 7/2011 | Huff et al. | |
| 2011/0314843 A1 | 12/2011 | Heinbokel | |
| 2012/0000237 A1 | 1/2012 | Yamada et al. | |
| 2012/0011866 A1 | 1/2012 | Scarcella et al. | |
| 2012/0055182 A1 | 3/2012 | Dube | |
| 2012/0073319 A1 | 3/2012 | Dube | |
| 2012/0192579 A1 | 8/2012 | Huff et al. | |
| 2012/0247148 A1 | 10/2012 | Dube | |
| 2012/0272665 A1 | 11/2012 | Watanabe et al. | |
| 2012/0272666 A1 | 11/2012 | Watanabe et al. | |
| 2013/0125569 A1 | 5/2013 | Verma et al. | |
| 2013/0233009 A1 | 9/2013 | Dube | |
| 2013/0298593 A1 | 11/2013 | Christensen | |
| 2013/0305742 A1 | 11/2013 | Wu et al. | |
| 2014/0007603 A1 | 1/2014 | Dube | |
| 2014/0116075 A1 | 5/2014 | Prins | |
| 2014/0157811 A1 | 6/2014 | Shimazu et al. | |
| 2014/0208785 A1 | 7/2014 | Wallace et al. | |
| 2014/0291411 A1 | 10/2014 | Tamaki et al. | |
| 2014/0326018 A1 | 11/2014 | Ignatiev | |
| 2014/0352343 A1 | 12/2014 | Hinde et al. | |
| 2015/0052927 A1 | 2/2015 | Yang et al. | |
| 2015/0128628 A1 | 5/2015 | Kawagoe et al. | |
| 2015/0345835 A1 | 12/2015 | Scott et al. | |
| 2015/0354882 A1 | 12/2015 | Dube | |
| 2016/0102901 A1 | 4/2016 | Christensen et al. | |
| 2016/0245575 A1 | 8/2016 | Dube | |
| 2017/0074551 A1 | 3/2017 | Kurata et al. | |
| 2017/0363337 A1 | 12/2017 | Swofford et al. | |
| 2018/0195794 A1 | 7/2018 | Saunders et al. | |
| 2018/0216851 A1 | 8/2018 | Christensen et al. | |
| 2018/0231290 A1 | 8/2018 | Zimmermann et al. | |
| 2018/0361828 A1 | 12/2018 | Kato et al. | |
| 2019/0024955 A1 | 1/2019 | Schroeder et al. | |
| 2019/0041005 A1 | 2/2019 | Martin et al. | |
| 2019/0368786 A1 | 12/2019 | Newel et al. | |
| 2020/0033039 A1 | 1/2020 | Krishnamoorthy et al. | |
| 2022/0357081 A1 | 11/2022 | Newel et al. | |

FOREIGN PATENT DOCUMENTS

| | | |
|---|---|---|
| EP | 2407734 | 1/2012 |
| EP | 2078178 | 5/2016 |
| EP | 2329206 | 10/2016 |
| EP | 2212631 | 12/2016 |
| GB | 2460726 | 12/2009 |
| JP | 2004257694 | 9/2004 |
| JP | 2005024210 | 1/2005 |
| JP | 2011503504 | 1/2011 |
| WO | WO 2006087011 | 8/2006 |
| WO | WO 2006091190 | 8/2006 |
| WO | WO 2009086493 | 7/2009 |
| WO | WO 2010045743 | 4/2010 |
| WO | WO 2011066214 | 6/2011 |
| WO | WO 2011071959 | 6/2011 |
| WO | WO 2013169591 | 11/2013 |
| WO | WO 2014068967 | 5/2014 |
| WO | WO 2014179699 | 11/2014 |

OTHER PUBLICATIONS

Extended European Search Report and Search Opinion regarding EP Application No. 19177708.5, dated Oct. 22, 2019, 6 pages.
Heat recovery from CO2 based refrigeration systems, Advansor Energisystemer, dated Mar. 26, 2008, 5 pages.
Heos user manual for high efficiency showcase controller, Carel Industries, dated Sep. 24, 2015, 56 pages.
Office Action in Brazilian Appln. No. BR102019011251-4, dated Mar. 21, 2023, 6 pages (with English translation).

* cited by examiner

$CO_2$ REFRIGERATION SYSTEM WITH MAGNETIC REFRIGERATION SYSTEM COOLING

CROSS-REFERENCE TO RELATED PATENT APPLICATIONS

This application is a divisional application of and claims priority under 35 U.S.C. § 120 to U.S. application Ser. No. 16/421,819, filed on May 24, 2019, which claims the benefit of and priority to U.S. Provisional Patent Application No. 62/680,879 filed Jun. 5, 2018, the entire contents of each of which are incorporated herein by reference.

BACKGROUND

The present disclosure relates generally to a refrigeration system primarily using carbon dioxide (i.e., $CO_2$) as a refrigerant. The present disclosure relates more particularly to a $CO_2$ refrigeration system with a magnetic refrigeration system that provides after-cooling, desuperheating, or other efficiency enhancements for the $CO_2$ refrigeration system.

Refrigeration systems are often used to provide cooling to temperature controlled display devices (e.g. cases, merchandisers, etc.) in supermarkets and other similar facilities. Vapor compression refrigeration systems are a type of refrigeration system which provides such cooling by circulating a fluid refrigerant (e.g., a liquid and/or vapor) through a thermodynamic vapor compression cycle. In a vapor compression cycle, the refrigerant is typically (1) compressed to a high temperature high pressure state (e.g., by a compressor of the refrigeration system), (2) cooled/condensed to a lower temperature state (e.g., in a gas cooler or condenser which absorbs heat from the refrigerant), (3) expanded to a lower pressure (e.g., through an expansion valve), and (4) evaporated to provide cooling by absorbing heat into the refrigerant. $CO_2$ refrigeration systems are a type of vapor compression refrigeration system that use $CO_2$ as a refrigerant.

SUMMARY

One implementation of the present disclosure is a refrigeration system including a refrigeration circuit and a coolant circuit separate from the refrigeration circuit. The refrigerant circuit includes a gas cooler/condenser configured to remove heat from a refrigerant circulating within the refrigeration circuit and having an outlet through which the refrigerant exits the gas cooler/condenser, a receiver having an inlet fluidly coupled to the outlet of the gas cooler/condenser and configured to collect the refrigerant from the gas cooler/condenser and having an outlet through which the refrigerant exits the receiver, and an evaporator having an inlet fluidly coupled to the outlet of the receiver and configured to receive the refrigerant from the receiver and transfer heat into the refrigerant circulating within the refrigeration circuit. The coolant circuit includes a heat exchanger configured to transfer heat from the refrigerant circulating within the refrigeration circuit into a coolant circulating within the coolant circuit. The heat exchanger includes a coolant inlet through which the coolant enters the heat exchanger and a coolant outlet through which the coolant exits the heat exchanger. The coolant circuit includes a heat sink configured to remove heat from the coolant circulating within the coolant circuit. The heat sink includes an inlet fluidly coupled to the coolant outlet of the heat exchanger and through which the coolant enters the heat sink and an outlet fluidly coupled to the coolant inlet of the heat exchanger and through which the coolant exits the heat sink. The coolant circuit includes a magnetocaloric conditioning unit configured to transfer heat from the coolant within a first fluid conduit of the coolant circuit into the coolant within a second fluid conduit of the coolant circuit. The first fluid conduit fluidly couples the coolant outlet of the heat exchanger to the inlet of the heat sink, whereas the second fluid conduit fluidly couples the outlet of the heat sink to the coolant inlet of the heat exchanger.

In some embodiments, the magnetocaloric conditioning unit is configured to perform a magnetocaloric refrigeration cycle using changing magnetic fields to transfer the heat from the coolant within the first fluid conduit into the coolant within the second fluid conduit.

In some embodiments, the heat exchanger is positioned along a fluid conduit of the refrigeration circuit connecting the outlet of the gas cooler/condenser to the inlet of the receiver.

In some embodiments, the refrigeration circuit includes a high pressure valve positioned along the fluid conduit connecting the outlet of the gas cooler/condenser to the inlet of the receiver. The heat exchanger may be positioned between the gas cooler/condenser and the high pressure valve to provide additional cooling for the refrigerant exiting the gas cooler/condenser before the refrigerant reaches the high pressure valve.

In some embodiments, the refrigeration circuit further includes a high pressure valve positioned along the fluid conduit connecting the outlet of the gas cooler/condenser to the inlet of the receiver. The heat exchanger may be positioned between the high pressure valve and the receiver to provide cooling for the refrigerant traveling from the high pressure valve to the receiver.

In some embodiments, the heat exchanger is positioned along a fluid conduit of the refrigeration circuit connecting the outlet of the receiver to the inlet of the evaporator to subcool the refrigerant exiting the receiver before the refrigerant reaches the evaporator.

In some embodiments, the coolant circuit includes a bypass conduit fluidly coupling the second fluid conduit of the coolant circuit to the first fluid conduit of the coolant circuit in parallel with the heat exchanger, thereby providing an alternative flow path for the coolant to travel from the second fluid conduit to the first fluid conduit without passing through the heat exchanger. The coolant circuit may include a control valve positioned along the bypass conduit and operable to control a flow of the coolant through at least one of the bypass conduit and the heat exchanger.

In some embodiments, the refrigeration system includes a temperature sensor positioned along the first fluid conduit between the magnetocaloric conditioning unit and a location at which the bypass conduit and the first fluid conduit intersect. The refrigeration circuit may include a controller configured to operate the control valve to maintain a temperature of the coolant measured by the temperature sensor at or below a temperature setpoint by varying an amount of the coolant permitted to bypass the heat exchanger via the bypass conduit.

In some embodiments, the refrigeration circuit includes one or more compressors configured to compress the refrigerant and discharge the compressed refrigerant into a compressor discharge line. The heat exchanger may be positioned along the compressor discharge line and configured to remove heat from the compressed refrigerant in the compressor discharge line.

In some embodiments, the refrigeration system includes a control valve operable to control a flow of the coolant through the heat exchanger and a controller configured to operate the control valve to maintain a superheat of the refrigerant exiting the heat exchanger at a predetermined superheat setpoint by varying an amount of heat removed from the compressed refrigerant in the heat exchanger.

In some embodiments, the refrigeration system includes a control valve operable to control a flow of the coolant through the heat exchanger and a controller configured to operate the control valve to cause the compressed refrigerant in the heat exchanger to fully condense to a liquid refrigerant by controlling an amount of heat removed from the compressed refrigerant in the heat exchanger.

In some embodiments, the heat exchanger includes a refrigerant outlet fluidly coupled to the receiver and configured to deliver the liquid refrigerant from the heat exchanger to the receiver.

In some embodiments, the coolant circuit includes a plurality of heat exchangers configured to transfer heat from the refrigerant circulating within the refrigeration circuit into the coolant circulating within the coolant circuit. The plurality of heat exchangers may include a first heat exchanger positioned along a fluid conduit of the refrigeration circuit connecting the outlet of the gas cooler/condenser to the inlet of the receiver to provide additional cooling for the refrigerant traveling from the gas cooler/condenser to the receiver and a second heat exchanger positioned along a compressor discharge line of the refrigeration circuit and configured to remove heat from the refrigerant in the compressor discharge line.

In some embodiments, the refrigeration circuit includes one or more compressors configured to receive the refrigerant from a compressor suction line, compress the refrigerant, and discharge the compressed refrigerant into a compressor discharge line. The heat exchanger may be positioned along the compressor suction line and configured to remove heat from the compressed refrigerant in the compressor suction line.

In some embodiments, the heat removed from the refrigerant in the heat exchanger causes the refrigerant to at least partially condense into a liquid or a mixture of liquid and gas. The refrigeration circuit may include a liquid/vapor separator fluidly coupled to a refrigerant outlet of the heat exchanger and configured to separate a liquid portion of the refrigerant exiting the heat exchanger from a gas portion of the refrigerant exiting the heat exchanger.

In some embodiments, the liquid/vapor separator includes a liquid refrigerant outlet fluidly coupled to the inlet of the receiver and configured to deliver the liquid portion of the refrigerant to the receiver and a gas refrigerant outlet fluidly coupled to the compressor suction line and configured to deliver the gas portion of the refrigerant to the compressor suction line.

Another implementation of the present disclosure is a magnetic refrigeration system including a heat exchanger, a heat sink, and a magnetocaloric conditioning unit. The heat exchanger is configured to transfer heat from a refrigerant circulating within a refrigeration circuit into a coolant circulating within a coolant circuit and includes a coolant inlet through which the coolant enters the heat exchanger and a coolant outlet through which the coolant exits the heat exchanger. The heat sink is configured to remove heat from the coolant circulating within the coolant circuit. The heat sink includes an inlet fluidly coupled to the coolant outlet of the heat exchanger and through which the coolant enters the heat sink and an outlet fluidly coupled to the coolant inlet of the heat exchanger and through which the coolant exits the heat sink. The magnetocaloric conditioning unit is configured to transfer heat from the coolant within a first fluid conduit of the coolant circuit into the coolant within a second fluid conduit of the coolant circuit. The first fluid conduit fluidly couples the fluid outlet of the heat exchanger to the inlet of the heat sink, whereas the second fluid conduit fluidly coupling the outlet of the heat sink to the coolant inlet of the heat exchanger.

In some embodiments, the magnetocaloric conditioning unit is configured to perform a magnetocaloric refrigeration cycle using changing magnetic fields to transfer the heat from the coolant within the first fluid conduit into the coolant within the second fluid conduit.

In some embodiments, the magnetic refrigeration system includes a control valve operable to control a flow of the coolant through the heat exchanger and a controller configured to operate the control valve to maintain a superheat of the refrigerant exiting the heat exchanger at a predetermined superheat setpoint by varying an amount of heat removed from the refrigerant in the heat exchanger.

In some embodiments, the magnetic refrigeration system includes a control valve operable to control a flow of the coolant through the heat exchanger and a controller configured to operate the control valve to cause the refrigerant in the heat exchanger to fully condense to a liquid refrigerant by controlling an amount of heat removed from the refrigerant in the heat exchanger.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

Figure 1:
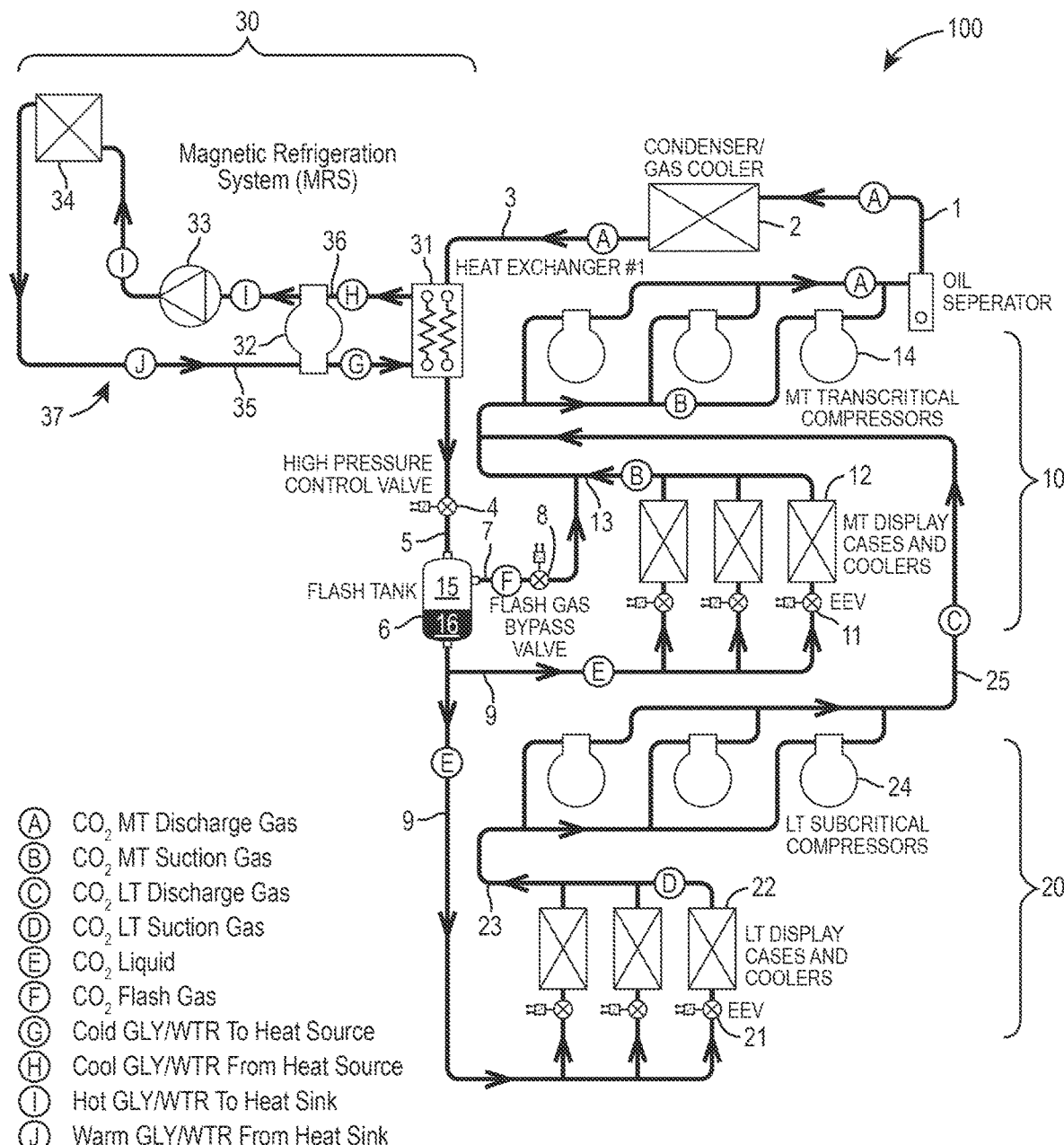
FIG. 1 is a schematic diagram of a $CO_2$ refrigeration system with a magnetic refrigeration system after-cooler, according to an exemplary embodiment.
Figure 2:
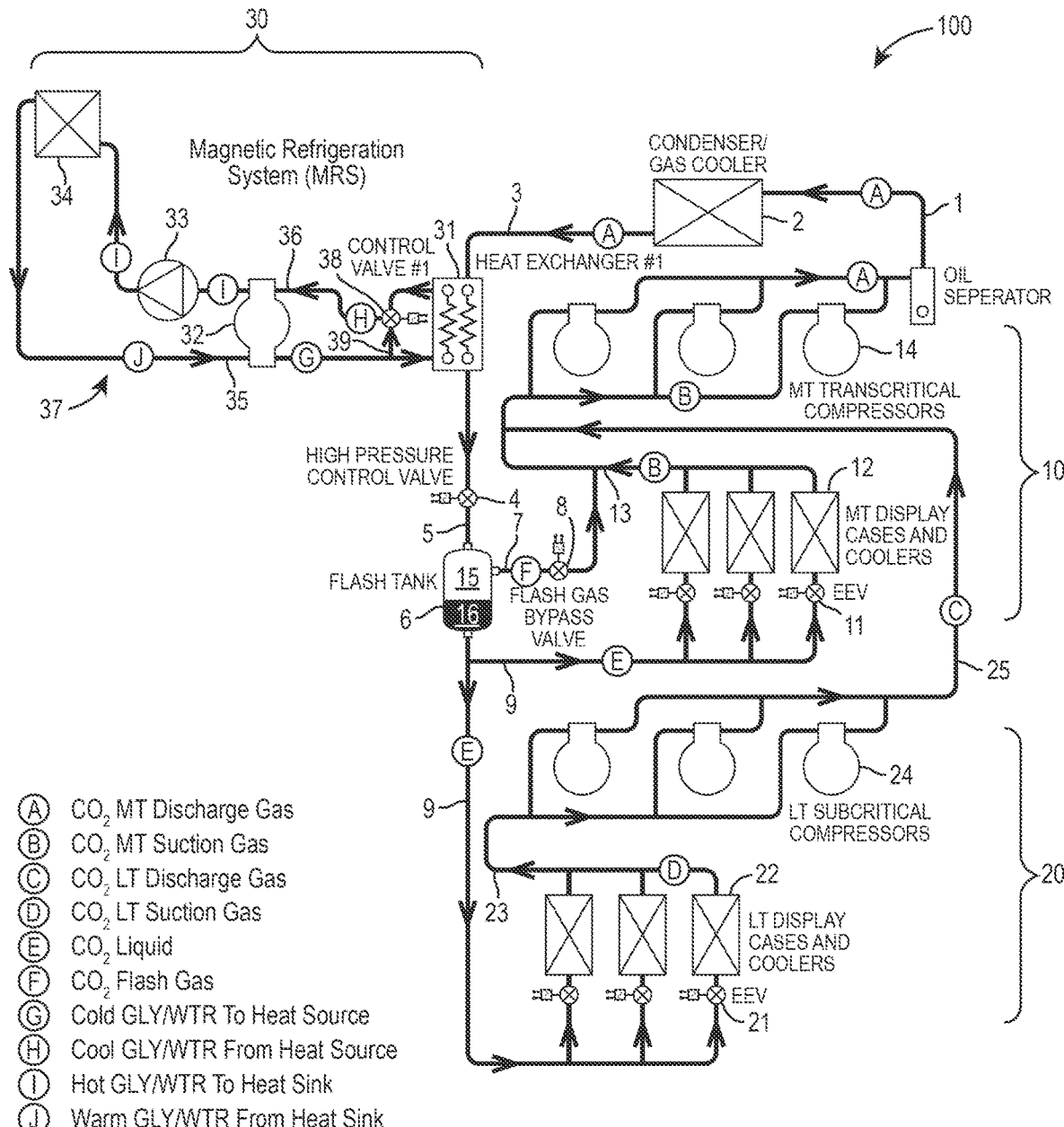
FIG. 2 is a schematic diagram of the $CO_2$ refrigeration system of FIG. 1 with a bypass line and control valve to bypass the after-cooler of the magnetic refrigeration system, according to an exemplary embodiment.

DETAILED DESCRIPTION $CO_2$ Refrigeration System with Magnetic Refrigeration System After-Cooler Referring to FIGS. 1-2, a $CO_2$ refrigeration system 100 is shown according to an exemplary embodiment. $CO_2$ refrigeration system 100 may be a vapor compression refrigeration system which uses primarily carbon dioxide ($CO_2$) as a refrigerant. $CO_2$ refrigeration system 100 and is shown to include a system of pipes, conduits, or other fluid channels (e.g., fluid conduits 1, 3, 5, 7, 9, 13, 23, and 25) for transporting the $CO_2$ refrigerant between various thermodynamic components of $CO_2$ refrigeration system 100. The thermodynamic components of $CO_2$ refrigeration system 100 are shown to include a gas cooler/condenser 2, a high pressure valve 4, a receiver 6, a gas bypass valve 8, a medium-temperature ("MT") subsystem 10, and a low-temperature ("LT") subsystem 20.

Gas cooler/condenser 2 may be a heat exchanger or other similar device for removing heat from the $CO_2$ refrigerant. Gas cooler/condenser 2 is shown receiving $CO_2$ gas from fluid conduit 1. In some embodiments, the $CO_2$ gas in fluid conduit 1 may have a pressure within a range from approximately 45 bar to approximately 100 bar (i.e., about 650 psig to about 1450 psig), depending on ambient temperature and other operating conditions. In some embodiments, gas cooler/condenser 2 may partially or fully condense $CO_2$ gas into liquid $CO_2$ (e.g., if system operation is in a subcritical region). The condensation process may result in fully saturated $CO_2$ liquid or a two-phase liquid-vapor mixture (e.g., having a thermodynamic vapor quality between 0 and 1). In other embodiments, gas cooler/condenser 2 may cool the $CO_2$ gas (e.g., by removing superheat) without condensing the $CO_2$ gas into $CO_2$ liquid (e.g., if system operation is in a supercritical region). In some embodiments, the cooling/condensation process is an isobaric process. Gas cooler/condenser 2 is shown outputting the cooled and/or condensed $CO_2$ refrigerant into fluid conduit 3.

High pressure valve 4 receives the cooled and/or condensed $CO_2$ refrigerant from fluid conduit 3 and outputs the $CO_2$ refrigerant to fluid conduit 5. High pressure valve 4 may control the pressure of the $CO_2$ refrigerant in gas cooler/condenser 2 by controlling an amount of $CO_2$ refrigerant permitted to pass through high pressure valve 4. In some embodiments, high pressure valve 4 is a high pressure thermal expansion valve (e.g., if the pressure in fluid conduit 3 is greater than the pressure in fluid conduit 5). In such embodiments, high pressure valve 4 may allow the $CO_2$ refrigerant to expand to a lower pressure state. The expansion process may be an isenthalpic and/or adiabatic expansion process, resulting in a flash expansion (e.g., a two-phase flash) of the high pressure $CO_2$ refrigerant to a lower pressure, lower temperature state. The expansion process may produce a liquid/vapor mixture (e.g., having a thermodynamic vapor quality between 0 and 1). In some embodiments, the $CO_2$ refrigerant expands to a pressure of approximately 38 bar (e.g., about 550 psig), which corresponds to a temperature of approximately 40° F. The $CO_2$ refrigerant then flows from fluid conduit 5 into receiver 6.

Receiver 6 collects the $CO_2$ refrigerant from fluid conduit 5. In some embodiments, receiver 6 may be a flash tank or other fluid reservoir. Receiver 6 includes a $CO_2$ liquid portion 16 and a $CO_2$ vapor portion 15 and may contain a partially saturated mixture of $CO_2$ liquid and $CO_2$ vapor. In some embodiments, receiver 6 separates the $CO_2$ liquid from the $CO_2$ vapor. The $CO_2$ liquid may exit receiver 6 through fluid conduits 9. Fluid conduits 9 may be liquid headers leading to MT subsystem 10 and/or LT subsystem 20. The $CO_2$ vapor may exit receiver 6 through fluid conduit 7. Fluid conduit 7 is shown leading the $CO_2$ vapor to a flash gas bypass valve 8.

Still referring to FIGS. 1-2, MT subsystem 10 is shown to include one or more expansion valves 11, one or more MT evaporators 12, and one or more MT compressors 14. In various embodiments, any number of expansion valves 11, MT evaporators 12, and MT compressors 14 may be present. Expansion valves 11 may be electronic expansion valves or other similar expansion valves. Expansion valves 11 are shown receiving liquid $CO_2$ refrigerant from fluid conduit 9 and outputting the $CO_2$ refrigerant to MT evaporators 12. Expansion valves 11 may cause the $CO_2$ refrigerant to undergo a rapid drop in pressure, thereby expanding the $CO_2$ refrigerant to a lower pressure, lower temperature two-phase state. In some embodiments, expansion valves 11 expand the $CO_2$ refrigerant to a pressure of approximately 20 bar to 25 bar and a temperature of approximately 0° F. to 13° F. In other embodiments, expansion valves 11 expand the $CO_2$ refrigerant to a pressure of approximately 30 bar. The expansion process may be an isenthalpic and/or adiabatic expansion process.

MT evaporators 12 are shown receiving the cooled and expanded $CO_2$ refrigerant from expansion valves 11. In some embodiments, MT evaporators may be associated with display cases/devices (e.g., if $CO_2$ refrigeration system 100 is implemented in a supermarket setting). MT evaporators 12 may be configured to facilitate the transfer of heat from the display cases/devices into the $CO_2$ refrigerant. The added heat may cause the $CO_2$ refrigerant to evaporate partially or completely. According to one embodiment, the $CO_2$ refrigerant is fully evaporated in MT evaporators 12. In some embodiments, the evaporation process may be an isobaric process. MT evaporators 12 are shown outputting the $CO_2$ refrigerant via fluid conduits 13, leading to MT compressors 14.

MT compressors 14 compress the $CO_2$ refrigerant into a superheated gas having a pressure within a range of approximately 45 bar to approximately 100 bar. The output pressure from MT compressors 14 may vary depending on ambient temperature and other operating conditions. In some embodiments, MT compressors 14 operate in a transcritical mode. In operation, the $CO_2$ discharge gas exits MT compressors 14 and flows through fluid conduit 1 into gas cooler/condenser 2.

Still referring to FIGS. 1-2, LT subsystem 20 is shown to include one or more expansion valves 21, one or more LT evaporators 22, and one or more LT compressors 24. In various embodiments, any number of expansion valves 21, LT evaporators 22, and LT compressors 24 may be present. In some embodiments, LT subsystem 20 may be omitted and the $CO_2$ refrigeration system 100 may operate with only MT subsystem 10.

Expansion valves 21 may be electronic expansion valves or other similar expansion valves. Expansion valves 21 are shown receiving liquid $CO_2$ refrigerant from fluid conduit 9 and outputting the $CO_2$ refrigerant to LT evaporators 22. Expansion valves 21 may cause the $CO_2$ refrigerant to undergo a rapid drop in pressure, thereby expanding the $CO_2$ refrigerant to a lower pressure, lower temperature two-phase state. The expansion process may be an isenthalpic and/or adiabatic expansion process. In some embodiments, expansion valves 21 may expand the $CO_2$ refrigerant to a lower pressure than expansion valves 11, thereby resulting in a lower temperature $CO_2$ refrigerant. Accordingly, LT subsystem 20 may be used in conjunction with a freezer system or other lower temperature display cases.

LT evaporators 22 are shown receiving the cooled and expanded $CO_2$ refrigerant from expansion valves 21. In some embodiments, LT evaporators may be associated with display cases/devices (e.g., if $CO_2$ refrigeration system 100 is implemented in a supermarket setting). LT evaporators 22 may be configured to facilitate the transfer of heat from the display cases/devices into the $CO_2$ refrigerant. The added heat may cause the $CO_2$ refrigerant to evaporate partially or completely. In some embodiments, the evaporation process may be an isobaric process. LT evaporators 22 are shown outputting the $CO_2$ refrigerant via fluid conduit 23, leading to LT compressors 24.

LT compressors 24 compress the $CO_2$ refrigerant. In some embodiments, LT compressors 24 may compress the $CO_2$ refrigerant to a pressure of approximately 30 bar (e.g., about 450 psig) having a saturation temperature of approximately 23° F. In some embodiments, LT compressors 24 operate in a subcritical mode. LT compressors 24 are shown outputting the $CO_2$ refrigerant through fluid conduit 25. Fluid conduit 25 may be fluidly connected with the suction (e.g., upstream) side of MT compressors 14.

Still referring to FIGS. 1-2, $CO_2$ refrigeration system 100 is shown to include a gas bypass valve 8. Gas bypass valve 8 may receive the $CO_2$ vapor from fluid conduit 7 and output the $CO_2$ refrigerant to MT subsystem 10. In some embodiments, gas bypass valve 8 is arranged in series with MT compressors 14. In other words, $CO_2$ vapor from receiver 6 may pass through both gas bypass valve 8 and MT compressors 14. MT compressors 14 may compress the $CO_2$ vapor passing through gas bypass valve 8 from a low pressure state (e.g., approximately 30 bar or lower) to a high pressure state (e.g., 45-100 bar).

Gas bypass valve 8 may be operated to regulate or control the pressure within receiver 6 (e.g., by adjusting an amount of $CO_2$ refrigerant permitted to pass through gas bypass valve 8). For example, gas bypass valve 8 may be adjusted (e.g., variably opened or closed) to adjust the mass flow rate, volume flow rate, or other flow rates of the $CO_2$ refrigerant through gas bypass valve 8. Gas bypass valve 8 may be opened and closed (e.g., manually, automatically, by a controller, etc.) as needed to regulate the pressure within receiver 6.

In some embodiments, gas bypass valve 8 includes a sensor for measuring a flow rate (e.g., mass flow, volume flow, etc.) of the $CO_2$ refrigerant through gas bypass valve 8. In other embodiments, gas bypass valve 8 includes an indicator (e.g., a gauge, a dial, etc.) from which the position of gas bypass valve 8 may be determined. This position may be used to determine the flow rate of $CO_2$ refrigerant through gas bypass valve 8, as such quantities may be proportional or otherwise related.

In some embodiments, gas bypass valve 8 may be a thermal expansion valve (e.g., if the pressure on the downstream side of gas bypass valve 8 is lower than the pressure in fluid conduit 7). According to one embodiment, the pressure within receiver 6 is regulated by gas bypass valve 8 to a pressure of approximately 38 bar, which corresponds to about 37° F. Advantageously, this pressure/temperature state may facilitate the use of copper tubing/piping for the downstream $CO_2$ lines of the system. Additionally, this pressure/temperature state may allow such copper tubing to operate in a substantially frost-free manner.

In some embodiments, the $CO_2$ vapor that is bypassed through gas bypass valve 8 is mixed with the $CO_2$ refrigerant gas exiting MT evaporators 12 (e.g., via fluid conduit 13). The bypassed $CO_2$ vapor may also mix with the discharge $CO_2$ refrigerant gas exiting LT compressors 24 (e.g., via fluid conduit 25). The combined $CO_2$ refrigerant gas may be provided to the suction side of MT compressors 14.

Still referring to FIGS. 1-2, $CO_2$ refrigeration system 100 is shown to include a magnetic refrigeration system (MRS) 30. MRS 30 can be configured to perform a magnetocaloric refrigeration cycle (i.e., a refrigeration cycle that uses the magnetocaloric effect) to provide after-cooling for the $CO_2$ refrigerant in fluid conduit 3. Relative to traditional, compressor-based air conditioning systems, MRS 30 may consume substantially less electrical power in providing comparable levels of cooling.

MRS 30 is shown to include a heat exchanger 31, a magnetocaloric conditioning unit 32, a pump 33, and a heat sink 34. Pump 33 may operate to circulate a coolant (e.g., water, glycol, a mixture of water and propylene glycol, etc.) through a coolant circuit 37 that fluidly couples heat exchanger 31, magnetocaloric conditioning unit 32, pump 33, and heat sink 34. Pump 33 may provide a substantially constant flow rate of the coolant, oscillating flow rates of the coolant, or pulses of coolant flow. Pump 33 may provide coolant to magnetocaloric conditioning unit 32 as needed to maximize the efficiency of the magnetocaloric cooling process.

Coolant circuit 37 is shown to include a first fluid conduit 35 that delivers the coolant from heat sink 34 to heat exchanger 31 and a second fluid conduit 36 that delivers the coolant from heat exchanger 31 to heat sink 34. Heat sink 34 may receive a supply of hot coolant via fluid conduit 36 and may transfer heat from the coolant to the ambient environment, thereby reducing the temperature of the coolant. Heat sink 34 may output a supply of reduced-temperature (e.g., warm) coolant into fluid conduit 35. In various embodiments, heat sink 34 may be positioned outdoors and exposed to outdoor ambient air or may be located indoors and exposed to a relatively constant indoor temperature. In some embodiments, the temperature of the coolant in fluid conduit 35 may be a single year-round fixed temperature related to the highest temperature of heat sink 34 and may be controlled to be independent of fluctuations in the temperature of heat sink 34. In other embodiments, the temperature of the coolant in fluid conduit 35 may be controlled to or allowed to "float" to different temperatures correlating with temperature of heat sink 34 at any given moment.

Heat exchanger 31 may be positioned along fluid conduit 3 and configured to transfer heat from the $CO_2$ refrigerant in fluid conduit 3 to the coolant in MRS 30. In some embodiments, heat exchanger 31 is positioned downstream of gas cooler/condenser 2 and provides additional cooling (i.e., after-cooing) for the $CO_2$ refrigerant exiting gas cooler/condenser 2. This lowers the temperature of the $CO_2$ refrigerant entering high pressure valve 4, which causes the colder $CO_2$ refrigerant to produce less flash gas than it would otherwise as it enters receiver 6. The reduction in the amount of flash gas causes a reduction in the amount of energy required for recompressing flash gas at MT compressors 14. Heat exchanger 31 may receive a supply of chilled coolant via fluid conduit 35, transfer heat from the $CO_2$ refrigerant into the coolant, and output the heated coolant via fluid conduit 36.

Magnetocaloric conditioning unit 32 may be fluidly coupled to both fluid conduits 35 and 36 and configured to transfer heat from the coolant in fluid conduit 35 to the coolant in fluid conduit 36. Magnetocaloric conditioning unit 32 may receive a supply of warm coolant from heat sink 34 via fluid conduit 35 as well as a supply of cool coolant from heat exchanger 31 via fluid conduit 36. Magnetocaloric conditioning unit 32 may transfer heat from the cool coolant in fluid conduit 35 to the warm coolant in fluid conduit 36, thereby providing additional cooling for the coolant entering heat exchanger 31.

Magnetocaloric conditioning unit 32 may perform a magnetocaloric refrigeration cycle (i.e., a refrigeration cycle that uses the magnetocaloric effect) to cool the coolant provided to heat exchanger 31. In some embodiments, magnetocaloric conditioning unit 32 uses changing magnetic fields to remove heat from the coolant in fluid conduit 35. The coolant in fluid conduit 35 thereby emerges from magnetocaloric conditioning unit 32 and enters heat exchanger 31 at a cold temperature. In some embodiments, magnetocaloric conditioning unit is made at least partially of a specialty alloy with a substantial magnetocaloric effect (e.g., gadolinium or synthetic alloy), and one or more magnets capable of generating a variable magnetic field around the specialty alloy (e.g., by moving relative to the specialty alloy, by varying in field strength).

In some embodiments, the specialty alloy in magnetocaloric conditioning unit 32 starts at room temperature. A magnetic field can be applied to the specialty alloy, which causes the alloy to increase in temperature due to magnetic properties of the alloy. With the magnetic field held constant, heat can be transferred from the alloy into the coolant in fluid conduit 36. The magnetic field can then be removed, and the magnetic properties of the alloy cause the alloy to drop significantly in temperature. The alloy then absorbs heat from the coolant in fluid conduit 35, causing the coolant to decrease in temperature. The coolant is thereby cooled by magnetocaloric conditioning unit 32. Due to properties of the specialty alloy, the increase in temperature of the alloy caused by the magnetic field may be substantially less than the decrease in temperature of the alloy caused by the removal of the magnetic field, resulting in a net decrease in temperature that can be applied to the coolant.

Various arrangements of coolant tube(s), magnets, and specialty alloys in magnetocaloric conditioning unit 32 are possible in various embodiments. In one example, the coolant flows through the center of a cylinder made of the specialty alloy. Magnets can be positioned around the specialty alloy. Varying power may be provided to electromagnets to vary the magnetic field. The coolant can then be pumped through the cylinder so that heat from the coolant is absorbed by the cylinder and the coolant is cooled and provided to heat exchanger 31. In various embodiments, magnetocaloric conditioning unit 32 includes a spinning disk, actuating pole, or spinning pole. It is contemplated that any type or configuration of magnetocaloric conditioning unit 32 can be used in MRS 30.

Referring particularly to FIG. 2, in some embodiments, MRS 30 includes a bypass conduit connecting fluid conduits 35 and 36. Bypass conduit 39 may provide an alternative path for the coolant to flow from fluid conduit 35 to fluid conduit 36 without passing through heat exchanger 31. In some embodiments, a control valve 38 is located along bypass conduit 39 or at the intersection of bypass conduit 39 and fluid conduit 36. Control valve 38 can be operated to control the flow of coolant through bypass conduit 39 and/or the flow of coolant through heat exchanger 31. In some embodiments, control valve 38 is operated to limit the amount of heat gained by the coolant in heat exchanger 31. For example, control valve 38 can be operated to minimize the amount of heat gained by the coolant in heat exchanger 31 to prevent MRS 30 from being overwhelmed.

In some embodiments, control valve 38 is operated to control the flow of coolant into heat exchanger 31 based on mixed fluid temperature of the coolant in fluid conduit 36 downstream of control valve 38. For example, MRS 30 may include a temperature sensor positioned along fluid conduit 36 between control valve 38 and magnetocaloric conditioning unit 32 and configured to measure the temperature of the coolant at the location of the temperature sensor. Control valve 38 can be operated to maintain the measured temperature of the mixed coolant (i.e., a mixture of the coolant exiting heat exchanger 31 and the coolant bypassing heat exchanger 31 via bypass conduit 39) at a predetermined temperature setpoint. Control valve 38 can be opened more to allow more of the cold coolant to bypass heat exchanger 31 via bypass conduit 39 in order to decrease the temperature of the mixed coolant, or closed more to allow less of the cold coolant to bypass heat exchanger 31 via bypass conduit 39 in order to increase the temperature of the mixed coolant.

Figure 3:
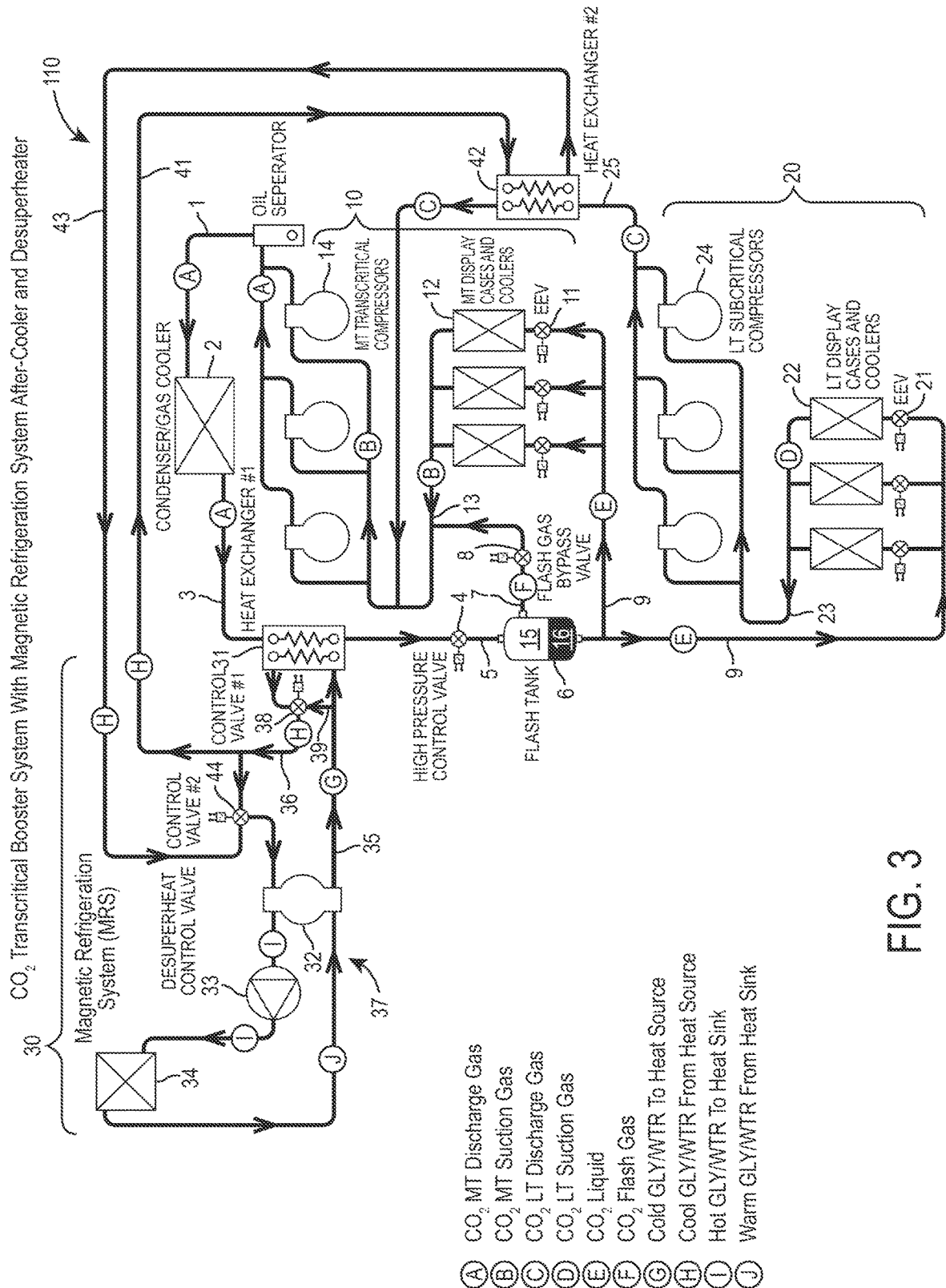
FIG. 3 is a schematic diagram of another $CO_2$ refrigeration system with a magnetic refrigeration system after-cooler and desuperheater, according to an exemplary embodiment.

$CO_2$ Refrigeration System with Magnetic Refrigeration System After-Cooler and Desuperheater Referring now to FIG. 3, another a $CO_2$ refrigeration system 110 is shown, according to an exemplary embodiment. $CO_2$ refrigeration system 110 is shown to include many of the same components as $CO_2$ refrigeration system 100, as described with reference to FIGS. 1-2. These components of $CO_2$ refrigeration system 110 (i.e., any component having the same reference number as a component of $CO_2$ refrigeration system 100) may have the same or similar configuration as the corresponding components of $CO_2$ refrigeration system 100 and may perform the same or similar functions as the corresponding components of $CO_2$ refrigeration system 100, as previously described with reference to FIGS. 1-2. Accordingly, the description of these components is not repeated here.

$CO_2$ refrigeration system 110 is shown to include a desuperheat heat exchanger 42. Desuperheat heat exchanger 42 may be positioned along fluid conduit 25 (i.e., the $CO_2$ refrigerant discharge line for LT compressors 24) and configured to absorb heat from the $CO_2$ refrigerant in fluid conduit 25, thereby decreasing the amount of superheat of the $CO_2$ refrigerant in fluid conduit 25. Coolant from MRS 30 may be provided to desuperheat heat exchanger 42 to provide cooling for the $CO_2$ refrigerant in desuperheat heat exchanger 42. Desuperheat heat exchanger 42 may transfer heat from the $CO_2$ refrigerant in fluid conduit 25 into the coolant from MRS 30, thereby cooling the $CO_2$ refrigerant and heating the coolant from MRS 30.

In some embodiments, a first fluid conduit 41 provides coolant from MRS 30 to desuperheat heat exchanger 42 and a second fluid conduit 43 returns the heated coolant from desuperheat heat exchanger 42 to MRS 30. As shown in FIG. 3, fluid conduit 41 may be connected to fluid conduit 36 at a first connection point between heat exchanger 31 and magnetocaloric conditioning unit 32 and configured to deliver the coolant from fluid conduit 36 to desuperheat heat exchanger 42. Similarly, fluid conduit 43 may be connected to fluid conduit 36 at a second connection point between heat exchanger 31 and magnetocaloric conditioning unit 32 (downstream of the first connection point) and configured to return the coolant from desuperheat heat exchanger 42 to fluid conduit 36.

CO$_2$ refrigeration system 110 may include one or more fluid control valves operable to control the flow of coolant to desuperheat heat exchanger 42. For example, CO$_2$ refrigeration system 110 is shown to include a control valve 44. Control valve 44 may be positioned along either of fluid conduits 41 or 43, at the intersection of fluid conduits 41 and 36, or at the intersection of fluid conduits 43 and 36. Control valve 44 can be operated to control the flow of coolant through fluid conduit 41, desuperheat heat exchanger 42, and fluid conduit 43. Control valve 38 may also be included in CO$_2$ refrigeration system 110 (performing the same function as previously described) or can be omitted from CO$_2$ refrigeration system 110 in various embodiments.

In some embodiments, control valves 44 and/or 38 are operated to increase the amount of heat transferred from the CO$_2$ refrigerant to the coolant in MRS 30. This allows MRS 30 to operate at its maximum capacity more often and thus maximize the energy reduction that MRS 30 provides to CO$_2$ refrigeration system 110. In some embodiments, control valves 44 and/or 38 are operated based on the temperature of the coolant provided by MRS 30 at various locations within MRS 30 (e.g., within any of the fluid conduits that contain coolant) and/or the temperature of the CO$_2$ refrigerant at various locations within CO$_2$ refrigeration system 110. For example, the temperatures of the coolant and/or the CO$_2$ refrigerant can be used to control the amount of coolant provided to heat exchanger 31 and/or desuperheat heat exchanger 42 depending on where heat collection is needed. Although only one desuperheat heat exchanger 42 is shown in FIG. 3, it is contemplated that any number of heat exchangers can be added to CO$_2$ refrigeration system 110 to collect heat from that CO$_2$ refrigerant at any location within CO$_2$ refrigeration system 110.

In some embodiments, control valves 44 and/or 38 are operated to control the amount of heat transferred from the CO$_2$ refrigerant to the coolant in MRS 30 based on the temperature of the mixed coolant returning to MRS 30 from heat exchanger 42. For example, a temperature sensor can be positioned along fluid conduit 36 between control valve 44 and magnetocaloric conditioning unit 32 and configured to measure the temperature of the mixed coolant at the location of the temperature sensor. Control valve 44 can be operated to control the flow of coolant to heat exchanger 42 based on the temperature of the mixed coolant.

In other embodiments, control valves 44 and/or 38 are operated to control the amount of heat transferred from the CO$_2$ refrigerant to the coolant in MRS 30 based on the temperature and/or pressure of the CO$_2$ refrigerant as it exits from heat exchanger 42. Temperature and/or pressure sensors can be positioned to measure the temperature/pressure of the CO$_2$ refrigerant at the exit of desuperheat heat exchanger 42. Controlling the flow of coolant to desuperheat heat exchanger 42 based on the temperature and/or pressure of the CO$_2$ refrigerant at the exit of desuperheat exchanger 42 allows for a specific amount of superheat to be maintained in the CO$_2$ refrigerant exiting desuperheat heat exchanger 42.

In some embodiments, the coolant from MRS 30 is supplied to desuperheat heat exchanger 42 (and/or other heat exchangers added to CO$_2$ refrigeration system 110) after first gathering heat from the CO$_2$ refrigerant in heat exchanger 31, as shown in FIG. 3. In other embodiments, the coolant from MRS 30 can be supplied to desuperheat heat exchanger 42 (and/or other heat exchangers added to CO$_2$ refrigeration system 110) in parallel with heat exchanger 31. For example, fluid conduit 41 may connect to fluid conduit 35 rather than fluid conduit 36 such that the cold coolant from fluid conduit 35 is provided to desuperheat heat exchanger 42. In other embodiments, the coolant from MRS 30 can be supplied to desuperheat heat exchanger 42 (and/or other heat exchangers added to CO$_2$ refrigeration system 110) before flowing through heat exchanger 31. For example, both fluid conduits 41 and 43 may connect to fluid conduit 35 rather than fluid conduit 36 such that the cold coolant from fluid conduit 35 is provided to desuperheat heat exchanger 42 and the coolant from desuperheat heat exchanger 42 is returned to fluid conduit 35. In other embodiments, the coolant from MRS 30 can be supplied to desuperheat heat exchanger 42 (and/or other heat exchangers added to CO$_2$ refrigeration system 110) instead of flowing to heat exchanger 31. For example, heat exchanger 31 can be omitted from CO$_2$ refrigeration system 110 in some embodiments and is not a required component.

Figure 4:
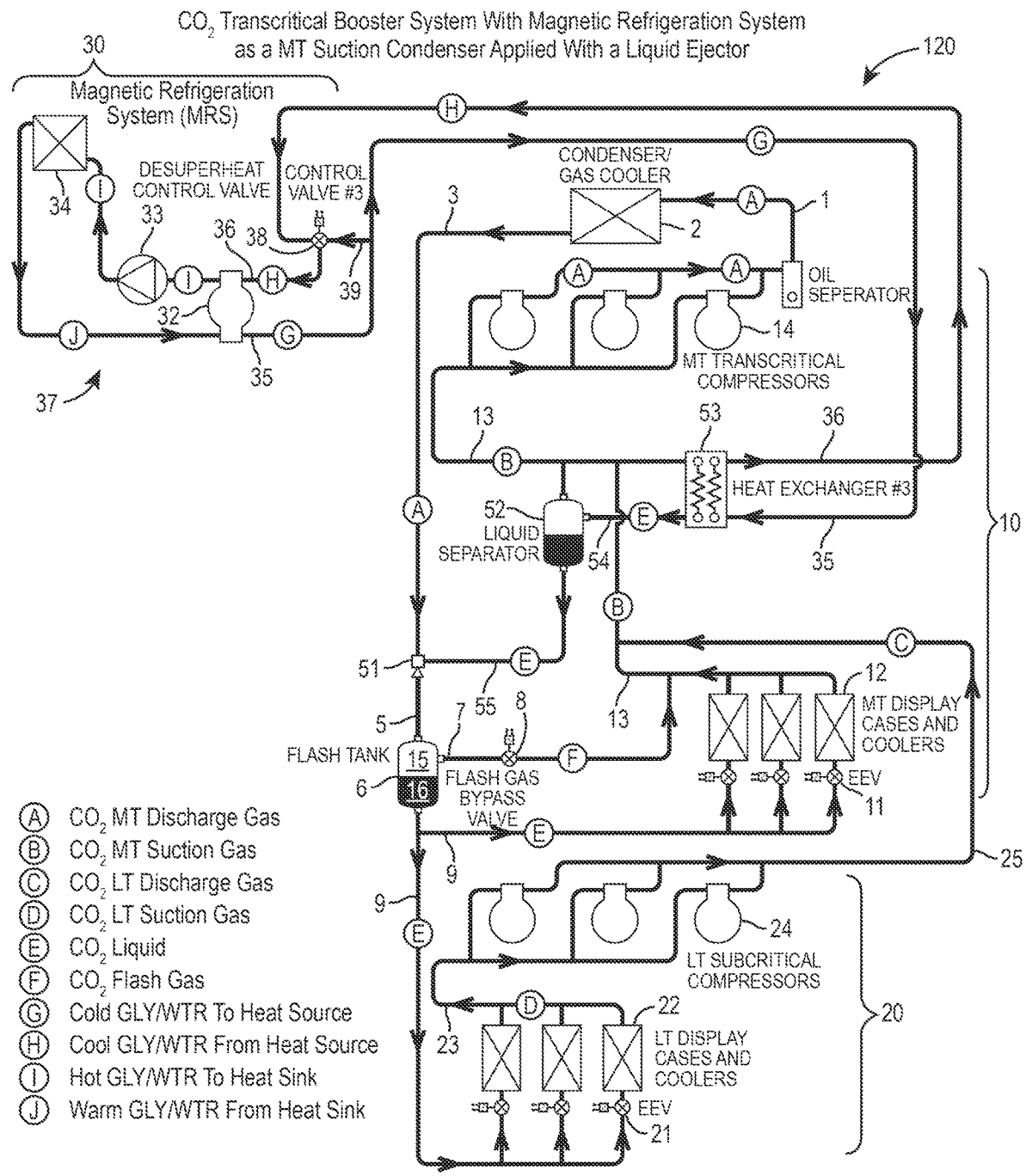
FIG. 4 is a schematic diagram of another $CO_2$ refrigeration system with a magnetic refrigeration system as a medium temperature suction condenser applied with a liquid ejector, according to an exemplary embodiment.

CO$_2$ Refrigeration System with Magnetic Refrigeration System as a MT Suction Condenser Applied with a Liquid Ejector Referring now to FIG. 4, another a CO$_2$ refrigeration system 120 is shown, according to an exemplary embodiment. CO$_2$ refrigeration system 120 is shown to include many of the same components as CO$_2$ refrigeration systems 100 and 110, as described with reference to FIGS. 1-3. These components of CO$_2$ refrigeration system 120 (i.e., any component having the same reference number as a component of CO$_2$ refrigeration systems 100 or 110) may have the same or similar configuration as the corresponding components of CO$_2$ refrigeration systems 100 or 110 and may perform the same or similar functions as the corresponding components of CO$_2$ refrigeration systems 100 or 110, as previously described with reference to FIGS. 1-3. Accordingly, the description of these components is not repeated here.

CO$_2$ refrigeration system 120 is shown to include a heat exchanger 53. Heat exchanger 53 may be configured to provide cooling for the CO$_2$ refrigerant in fluid conduit 13 (i.e., the suction line for MT compressors 14). Heat exchanger 53 may absorb heat from the CO$_2$ refrigerant in fluid conduit 13. Like heat exchanger 31 of CO$_2$ refrigeration systems 100 or 110, heat exchanger 53 may receive coolant from MRS 30 via fluid conduit 35 and may return coolant to MRS 30 via fluid conduit 36. Coolant from MRS 30 may be provided to heat exchanger 53 via fluid conduit 35 to provide cooling for the CO$_2$ refrigerant in heat exchanger 53. Heat exchanger 53 may transfer heat from the CO$_2$ refrigerant in fluid conduit 13 into the coolant from MRS 30, thereby cooling the CO$_2$ refrigerant and heating the coolant from MRS 30. The heated coolant may then return to MRS 30 via fluid conduit 36.

In some embodiments, the temperature of the coolant supplied to heat exchanger 53 is controlled such that it will cause the CO$_2$ refrigerant vapor from fluid conduit 13 to condense (fully or partially) in heat exchanger 53. The condensed CO$_2$ liquid or liquid/vapor mixture may exit heat exchanger 53 via fluid conduit 54 and may be collected in a liquid/vapor separator 52. Liquid CO$_2$ refrigerant within liquid/vapor separator 52 can be delivered to receiver 6 via fluid conduits 55 and 5. In some embodiments, the pressure within receiver 6 is higher than the pressure within liquid/vapor separator 52. Accordingly, a motive force may be required to move the liquid CO$_2$ refrigerant from liquid/vapor separator 52 to receiver 6. In various embodiments, the motive force may be supplied by gravity (e.g., by locating liquid/vapor separator 52 at a higher elevation than receiver 6) or by a mechanical device such as a pump or an ejector 51. For example, ejector 51 may be located at the intersection of fluid conduits 55 and 5 (in place of high pressure valve 4 or installed in parallel to high pressure valve 4 shown in FIGS. 1-3) and configured to force the liquid $CO_2$ refrigerant from fluid conduit 55 into receiver 6 via fluid conduit 5.

In some embodiments, control valve 38 is operated to increase the amount of heat transferred from the $CO_2$ refrigerant to the coolant in MRS 30. This allows MRS 30 to operate at its maximum capacity more often and thus maximize the energy reduction that MRS 30 provides to $CO_2$ refrigeration system 120. In some embodiments, control valve 38 is operated based on the temperature of the coolant provided by MRS 30 at various locations within MRS 30 (e.g., within any of the fluid conduits that contain coolant) and/or the temperature of the $CO_2$ refrigerant at various locations within $CO_2$ refrigeration system 120. For example, the temperatures of the coolant and/or the $CO_2$ refrigerant can be used to control the amount of coolant provided to heat exchanger 53.

In some embodiments, control valve 38 is operated to control the amount of heat transferred from the $CO_2$ refrigerant to the coolant in MRS 30 based on the temperature of the mixed coolant returning to MRS 30 from heat exchanger 53. For example, a temperature sensor can be positioned along fluid conduit 36 between control valve 38 and magnetocaloric conditioning unit 32 and configured to measure the temperature of the mixed coolant at the location of the temperature sensor (e.g., after the coolant returning from heat exchanger 53 mixes with the coolant bypassing heat exchanger 53 via bypass conduit 39). Control valve 38 can be operated to control the flow of coolant to heat exchanger 53 based on the temperature of the mixed coolant. In some embodiments, a temperature sensor can be positioned along fluid conduit 36 upstream of control valve 38 and configured to measure the temperature of the coolant exiting heat exchanger 53 (e.g., before the coolant returning from heat exchanger 53 mixes with the coolant bypassing heat exchanger 53 via bypass conduit 39). Control valve 38 can be operated to control the flow of coolant to heat exchanger 53 based on the temperature of the coolant exiting heat exchanger 53.

In other embodiments, control valve 38 is operated to control the amount of heat transferred from the $CO_2$ refrigerant to the coolant in MRS 30 based on the temperature and/or pressure of the $CO_2$ refrigerant as it exits from heat exchanger 53. Temperature and/or pressure sensors can be positioned to measure the temperature/pressure of the $CO_2$ refrigerant at the exit of heat exchanger 53. Controlling the flow of coolant to heat exchanger 53 based on the temperature and/or pressure of the $CO_2$ refrigerant at the exit of exchanger 53 allows for a specific amount of superheat to be maintained in the $CO_2$ refrigerant exiting heat exchanger 53. The amount of heat transferred from the $CO_2$ refrigerant to the coolant in MRS 30 can also (or alternatively) be controlled by adjusting the temperature of the coolant supplied to heat exchanger 53 (e.g., by controlling the operation of magnetocaloric conditioning unit 32) without requiring the use of control valve 38.

Figure 5:
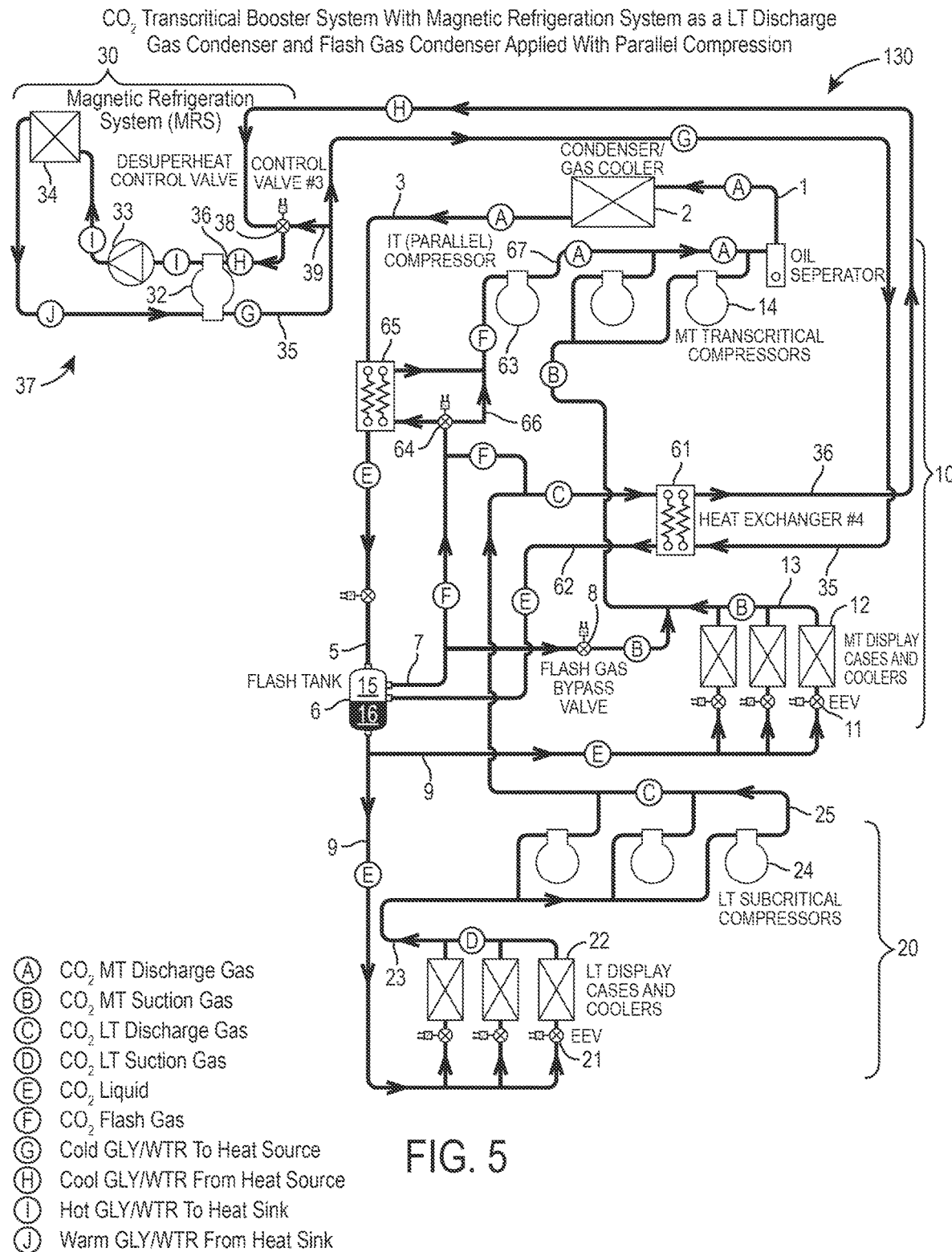
FIG. 5 is a schematic diagram of another $CO_2$ refrigeration system with a magnetic refrigeration system as a low temperature discharge gas condenser and flash gas condenser applied with parallel compression, according to an exemplary embodiment.

$CO_2$ Refrigeration System with Magnetic Refrigeration System as a LT Discharge Gas Condenser and Flash Gas Condenser Applied with Parallel Compression Referring now to FIG. 5, another a $CO_2$ refrigeration system 130 is shown, according to an exemplary embodiment. $CO_2$ refrigeration system 130 is shown to include many of the same components as $CO_2$ refrigeration systems 100, 110, and 120, as described with reference to FIGS. 1-4. These components of $CO_2$ refrigeration system 130 (i.e., any component having the same reference number as a component of $CO_2$ refrigeration systems 100, 110, or 120) may have the same or similar configuration as the corresponding components of $CO_2$ refrigeration systems 100, 110, or 120 and may perform the same or similar functions as the corresponding components of $CO_2$ refrigeration systems 100, 110, or 120 as previously described with reference to FIGS. 1-4. Accordingly, the description of these components is not repeated here.

$CO_2$ refrigeration system 130 is shown to include a heat exchanger 61. Heat exchanger 61 may be configured to provide cooling for the $CO_2$ refrigerant in fluid conduit 25 (i.e., the discharge line for LT compressors 24). Heat exchanger 61 may absorb heat from the $CO_2$ refrigerant vapor in fluid conduit 25, thereby causing the $CO_2$ refrigerant in fluid conduit 25 to condense into a liquid. Like heat exchanger 31 of $CO_2$ refrigeration systems 100 or 110, heat exchanger 61 may receive coolant from MRS 30 via fluid conduit 35 and may return coolant to MRS 30 via fluid conduit 36. Coolant from MRS 30 may be provided to heat exchanger 61 via fluid conduit 35 to provide cooling for the $CO_2$ refrigerant in heat exchanger 61. Heat exchanger 61 may transfer heat from the $CO_2$ refrigerant in fluid conduit 25 into the coolant from MRS 30, thereby cooling the $CO_2$ refrigerant and heating the coolant from MRS 30. The heated coolant may then return to MRS 30 via fluid conduit 36.

In some embodiments, the temperature of the coolant supplied to heat exchanger 61 is controlled such that it will cause the $CO_2$ refrigerant vapor from fluid conduit 25 to fully condense in heat exchanger 61. The condensed $CO_2$ refrigerant liquid may exit heat exchanger 61 via fluid conduit 62 and may be collected in receiver 6. Heat exchanger 61 may be located in line between LT compressor discharge line 25 and receiver 6 (as shown in FIG. 5) or may be independently connected to receiver 6. MRS 30 may be sized and/or controlled to manage the $CO_2$ vapor in receiver 6 by condensing all of the $CO_2$ refrigerant vapor present in receiver 6. In some embodiments, MRS 30 manages the $CO_2$ refrigerant vapor in receiver 6 by working in parallel with a parallel compressor 63. Parallel compressor 63 may be connected to the vapor portion 15 of receiver 6 (e.g., via fluid conduits 7 and 66) and configured to compress the $CO_2$ refrigerant vapor. In various embodiments, parallel compressor 63 may work in parallel with MT compressors 14 or may be implemented as a replacement for MT compressors 14 (i.e., MT compressors 14 and/or other portions of MT subsystem 10 can be omitted).

In some embodiments, parallel compressor 63 may be operated (e.g., by a controller) to achieve a desired pressure within receiver 6. For example, the controller may receive pressure measurements from a pressure sensor monitoring the pressure within receiver 6 and may activate or deactivate parallel compressor 63 based on the pressure measurements. When active, parallel compressor 63 compresses the $CO_2$ vapor received via connecting line 66 and discharges the compressed vapor into connecting line 67. Connecting line 67 may be fluidly connected with fluid conduit 1. Accordingly, parallel compressor 63 may operate in parallel with MT compressors 14 by discharging the compressed $CO_2$ vapor into a shared fluid conduit (e.g., fluid conduit 1).

Parallel compressor 63 may be arranged in parallel with both gas bypass valve 8 and with MT compressors 14. In other words, $CO_2$ vapor exiting receiver 6 may pass through either parallel compressor 63 or the series combination of gas bypass valve 8 and MT compressors 14. Parallel compressor 63 may receive the $CO_2$ vapor at a relatively higher pressure (e.g., from fluid conduits 7 and 66) than the $CO_2$ vapor received by MT compressors 14 (e.g., from fluid conduit 13). This differential in pressure may correspond to the pressure differential across gas bypass valve 8. In some embodiments, parallel compressor 63 may require less energy to compress an equivalent amount of $CO_2$ vapor to the high pressure state (e.g., in fluid conduit 1) as a result of the higher pressure of $CO_2$ vapor entering parallel compressor 63. Therefore, the parallel route including parallel compressor 63 may be a more efficient alternative to the route including gas bypass valve 8 and MT compressors 14.

In some embodiments, gas bypass valve 8 is omitted and the pressure within receiver 6 is regulated using parallel compressor 63. In other embodiments, parallel compressor 63 is omitted and the pressure within receiver 6 is regulated using gas bypass valve 8. In other embodiments, both gas bypass valve 8 and parallel compressor 6 are used to regulate the pressure within receiver 6. All such variations are within the scope of the present disclosure.

In some embodiments, $CO_2$ refrigeration system 130 includes a heat exchanger 65. Heat exchanger 65 may be positioned along fluid conduit 3 and can be configured to condense (fully or partially) the $CO_2$ refrigerant in fluid conduit 3. Heat exchanger 65 may also receive $CO_2$ refrigerant vapor from receiver 6 via fluid conduit 7. A control valve 64 can be operated to regulate the flow of $CO_2$ refrigerant vapor from receiver 6 into heat exchanger 65. Heat exchanger 65 may transfer heat from the $CO_2$ refrigerant in fluid conduit 3 into the $CO_2$ refrigerant vapor in fluid conduit 66, thereby providing additional cooling for the $CO_2$ refrigerant entering receiver 6. The heated $CO_2$ refrigerant vapor in fluid conduit 66 may be routed to parallel compressor 63 and compressed as previously described. Control valve 64 can be operated to control the amount of $CO_2$ refrigerant vapor routed through heat exchanger 65 and/or the amount of $CO_2$ refrigerant vapor that flows from fluid conduit 7 directly into fluid conduit 66 (bypassing heat exchanger 65).

Figure 6:
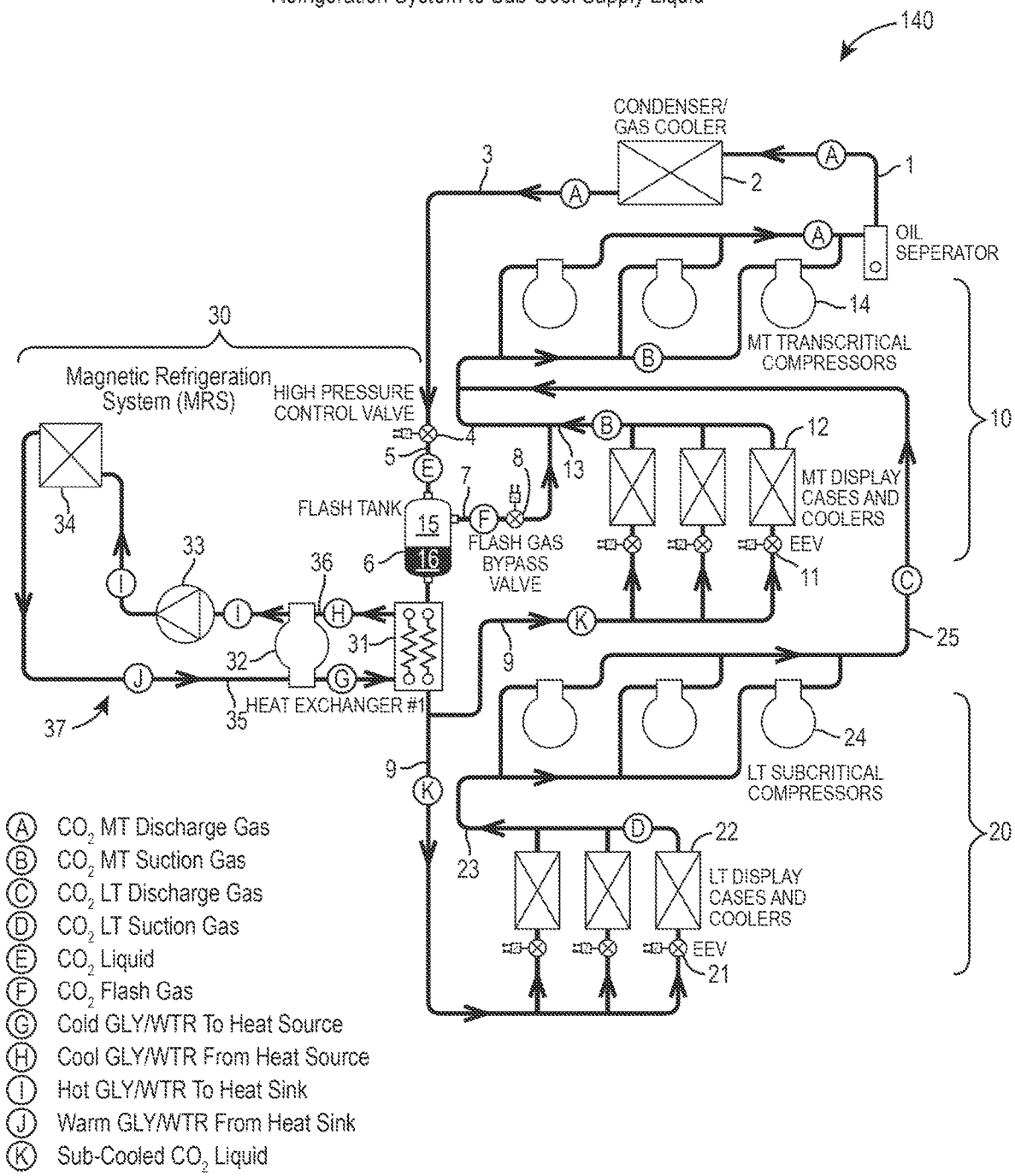
FIG. 6 is a schematic diagram of another $CO_2$ refrigeration system with a magnetic refrigeration system to subcool supply liquid exiting a receiver, according to an exemplary embodiment.

$CO_2$ Refrigeration System with Magnetic Refrigeration System to Sub-Cool Supply Liquid Referring now to FIG. 6, another a $CO_2$ refrigeration system 140 is shown, according to an exemplary embodiment. $CO_2$ refrigeration system 140 is shown to include many of the same components as $CO_2$ refrigeration systems 100, 110, 120, and 130, as described with reference to FIGS. 1-4. These components of $CO_2$ refrigeration system 140 (i.e., any component having the same reference number as a component of $CO_2$ refrigeration systems 100, 110, 120, and 130) may have the same or similar configuration as the corresponding components of $CO_2$ refrigeration systems 100, 110, 120, and 130 and may perform the same or similar functions as the corresponding components of $CO_2$ refrigeration systems 100, 110, 120, and 130 as previously described with reference to FIGS. 1-5. Accordingly, the description of these components is not repeated here.

$CO_2$ refrigeration system 140 is substantially the same as $CO_2$ refrigeration system 100, with the exception that heat exchanger 31 of MRS 30 is located along fluid conduit 9 (i.e., the $CO_2$ liquid supply line exiting receiver 6) rather than fluid conduit 3. Fluid conduit 9 may supply liquid $CO_2$ refrigerant to both MT evaporators 12 and LT evaporators 22. Using MRS 30 to extract heat from the liquid $CO_2$ refrigerant in fluid conduit 9 may subcool the saturated liquid $CO_2$ refrigerant from receiver 6 to a colder temperature than the $CO_2$ refrigerant gas (i.e., flash gas) in receiver 6 without reducing the pressure within fluid conduit 9. This will enhance the liquid quality of the $CO_2$ refrigerant (i.e., reduce the quality of the saturated liquid/gas mixture toward zero) as it enters expansion valves 11 and 21, and thus increase the amount of heat that the $CO_2$ refrigerant can absorb through evaporation in evaporators 12 and 22. As more heat energy can be absorbed per unit mass of the $CO_2$ refrigerant, compressors 14 and 24 will not be required to process as much mass flow to match the same refrigeration load. Advantageously, this may decrease the required amount of energy consumption.

$CO_2$ Refrigeration System with Magnetic Refrigeration System to Convert Flash Gas to Liquid Before Entering Flash Tank (Receiver)

Figure 7:
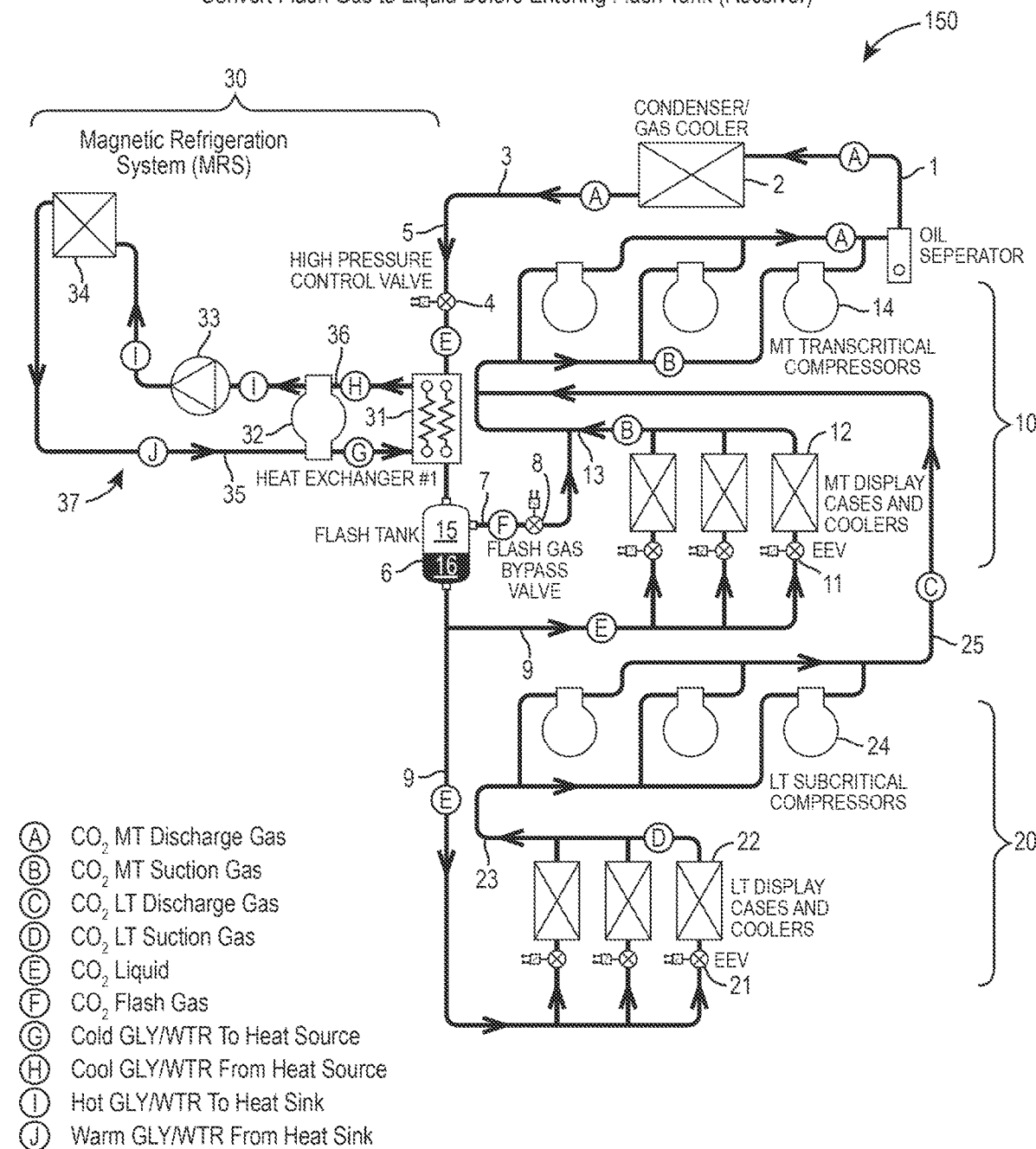
FIG. 7 is a schematic diagram of another $CO_2$ refrigeration system with a magnetic refrigeration system to convert flash gas to liquid before entering a receiver, according to an exemplary embodiment.

Referring now to FIG. 7, another a $CO_2$ refrigeration system 150 is shown, according to an exemplary embodiment. $CO_2$ refrigeration system 150 is shown to include many of the same components as $CO_2$ refrigeration systems 100, 110, 120, 130, and 140, as described with reference to FIGS. 1-6. These components of $CO_2$ refrigeration system 150 (i.e., any component having the same reference number as a component of $CO_2$ refrigeration systems 100, 110, 120, 130, and 140) may have the same or similar configuration as the corresponding components of $CO_2$ refrigeration systems 100, 110, 120, 130, and 140 and may perform the same or similar functions as the corresponding components of $CO_2$ refrigeration systems 100, 110, 120, 130, and 140 as previously described with reference to FIGS. 1-6. Accordingly, the description of these components is not repeated here.

$CO_2$ refrigeration system 150 is substantially the same as $CO_2$ refrigeration system 100, with the exception that heat exchanger 31 of MRS 30 is located along fluid conduit 5 (i.e., the fluid conduit connecting high pressure valve 4 to receiver 6) rather than fluid conduit 3. Placing heat exchanger 31 of MRS 30 along fluid conduit 5 will provide cooling for the $CO_2$ refrigerant entering receiver and reduce the amount of flash gas seen in receiver 6. Advantageously, this may reduce the power required by MT compressors 14 to process the short-circuited $CO_2$ refrigerant gas.

CONFIGURATION OF EXEMPLARY EMBODIMENTS

The construction and arrangement of the $CO_2$ refrigeration systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims of this disclosure and is not admitted to be prior art by inclusion in the background section.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

What is claimed is:

1. A refrigeration system comprising:
   a refrigeration circuit comprising:
      a gas cooler/condenser configured to remove heat from a refrigerant circulating within the refrigeration circuit and comprising an outlet through which the refrigerant exits the gas cooler/condenser;
      a receiver comprising an inlet fluidly coupled to the outlet of the gas cooler/condenser and configured to collect the refrigerant from the gas cooler/condenser, the receiver further comprising an outlet through which the refrigerant exits the receiver; and
      an evaporator comprising an inlet fluidly coupled to the outlet of the receiver and configured to receive the refrigerant from the receiver, the evaporator configured to transfer heat into the refrigerant circulating within the refrigeration circuit; and
   a coolant circuit fluidly separate from the refrigeration circuit and comprising:
      a heat exchanger configured to transfer heat from the refrigerant circulating within the refrigeration circuit into a coolant circulating within the coolant circuit, the heat exchanger comprising a coolant inlet through which the coolant enters the heat exchanger and a coolant outlet through which the coolant exits the heat exchanger;
      a heat sink configured to remove heat from the coolant circulating within the coolant circuit, the heat sink comprising an inlet fluidly coupled to the coolant outlet of the heat exchanger and through which the coolant enters the heat sink, and comprising an outlet fluidly coupled to the coolant inlet of the heat exchanger and through which the coolant exits the heat sink; and
      a magnetocaloric conditioning unit configured to transfer heat from the coolant within a first fluid conduit of the coolant circuit into the coolant within a second fluid conduit of the coolant circuit, the first fluid conduit fluidly coupling the coolant outlet of the heat exchanger to the inlet of the heat sink, and the second fluid conduit fluidly coupling the outlet of the heat sink to the coolant inlet of the heat exchanger.

2. The refrigeration system of claim 1, wherein the magnetocaloric conditioning unit is configured to perform a magnetocaloric refrigeration cycle using changing magnetic fields to transfer the heat from the coolant within the first fluid conduit into the coolant within the second fluid conduit.

3. The refrigeration system of claim 1, wherein the heat exchanger is positioned along a fluid conduit of the refrigeration circuit connecting the outlet of the gas cooler/condenser to the inlet of the receiver.

4. The refrigeration system of claim 3, the refrigeration circuit further comprising a high pressure valve positioned along the fluid conduit connecting the outlet of the gas cooler/condenser to the inlet of the receiver;
wherein the heat exchanger is positioned between the gas cooler/condenser and the high pressure valve to provide additional cooling for the refrigerant exiting the gas cooler/condenser before the refrigerant reaches the high pressure valve.

5. The refrigeration system of claim 1, wherein the coolant circuit comprises:
a bypass conduit fluidly coupling the second fluid conduit of the coolant circuit to the first fluid conduit of the coolant circuit in parallel with the heat exchanger, thereby providing an alternative flow path for the coolant to travel from the second fluid conduit to the first fluid conduit without passing through the heat exchanger; and
a control valve positioned along the bypass conduit and operable to control a flow of the coolant through at least one of the bypass conduit and the heat exchanger.

6. The refrigeration system of claim 5, further comprising:
a temperature sensor positioned along the first fluid conduit between the magnetocaloric conditioning unit and a location at which the bypass conduit and the first fluid conduit intersect; and
a controller configured to operate the control valve to maintain a temperature of the coolant measured by the temperature sensor at or below a temperature setpoint by varying an amount of the coolant permitted to bypass the heat exchanger via the bypass conduit.

7. The refrigeration system of claim 1, the refrigeration circuit further comprising one or more compressors configured to compress the refrigerant and discharge the compressed refrigerant into a compressor discharge line;
wherein the heat exchanger is positioned along the compressor discharge line and configured to remove heat from the compressed refrigerant in the compressor discharge line.

8. The refrigeration system of claim 7, further comprising:
a control valve operable to control a flow of the coolant through the heat exchanger; and
a controller configured to operate the control valve to maintain a superheat of the refrigerant exiting the heat exchanger at a predetermined superheat setpoint by varying an amount of heat removed from the compressed refrigerant in the heat exchanger.

9. The refrigeration system of claim 7, further comprising:
a control valve operable to control a flow of the coolant through the heat exchanger; and
a controller configured to operate the control valve to cause the compressed refrigerant in the heat exchanger to fully condense to a liquid refrigerant by controlling an amount of heat removed from the compressed refrigerant in the heat exchanger.

10. The refrigeration system of claim 9, wherein the heat exchanger comprises a refrigerant outlet fluidly coupled to the receiver and configured to deliver the liquid refrigerant from the heat exchanger to the receiver.

11. The refrigeration system of claim 1, the refrigeration circuit further comprising one or more compressors configured to receive the refrigerant from a compressor suction line, compress the refrigerant, and discharge the compressed refrigerant into a compressor discharge line;
wherein the heat exchanger is positioned along the compressor suction line and configured to remove heat from the compressed refrigerant in the compressor suction line.

12. The refrigeration system of claim 4, wherein the high pressure valve is configured to control a pressure of the refrigerant in the gas cooler/condenser by controlling an amount refrigerant permitted to pass through the high pressure valve.

13. The refrigeration system of claim 4, wherein the high pressure valve comprises a high pressure thermal expansion valve configured to allow the refrigerant to expand to a lower pressure state.

14. The refrigeration system of claim 13, wherein the refrigerant is allowed to expand to a lower pressure state, resulting in a flash expansion of the refrigerant to a lower pressure state and a lower temperature state, producing a liquid/vapor mixture.

15. The refrigeration system of claim 1, further comprising:
a flash gas conduit fluidly coupled to the receiver and an outlet of the evaporator; and
a gas bypass valve positioned in the flash gas conduit, the gas bypass valve configured to control a flow of refrigerant from the receiver to the outlet of the evaporator.

16. The refrigeration system of claim 2, the refrigeration circuit further comprising one or more compressors configured to receive the refrigerant from a compressor suction line, compress the refrigerant, and discharge the compressed refrigerant into a compressor discharge line;
wherein the heat exchanger is positioned along the compressor suction line and configured to remove heat from the compressed refrigerant in the compressor suction line.

17. A magnetic refrigeration system comprising:
a heat exchanger configured to transfer heat from a refrigerant circulating within a refrigeration circuit into a coolant circulating within a coolant circuit, the heat exchanger comprising a coolant inlet through which the coolant enters the heat exchanger and a coolant outlet through which the coolant exits the heat exchanger;
a heat sink configured to remove heat from the coolant circulating within the coolant circuit, the heat sink comprising an inlet fluidly coupled to the coolant outlet of the heat exchanger and through which the coolant enters the heat sink, and comprising an outlet fluidly coupled to the coolant inlet of the heat exchanger and through which the coolant exits the heat sink; and
a magnetocaloric conditioning unit configured to transfer heat from the coolant within a first fluid conduit of the coolant circuit into the coolant within a second fluid conduit of the coolant circuit, the first fluid conduit fluidly coupling the coolant outlet of the heat exchanger to the inlet of the heat sink, and the second fluid conduit fluidly coupling the outlet of the heat sink to the coolant inlet of the heat exchanger.

18. The magnetic refrigeration system of claim 17, wherein the magnetocaloric conditioning unit is configured to perform a magnetocaloric refrigeration cycle using changing magnetic fields to transfer the heat from the coolant within the first fluid conduit into the coolant within the second fluid conduit.

19. The magnetic refrigeration system of claim 17, further comprising:

a control valve operable to control a flow of the coolant through the heat exchanger; and a controller configured to operate the control valve to maintain a superheat of the refrigerant exiting the heat exchanger at a predetermined superheat setpoint by varying an amount of heat removed from the refrigerant in the heat exchanger.

20. The magnetic refrigeration system of claim 17, further comprising:

a control valve operable to control a flow of the coolant through the heat exchanger; and a controller configured to operate the control valve to cause the refrigerant in the heat exchanger to fully condense to a liquid refrigerant by controlling an amount of heat removed from the refrigerant in the heat exchanger.

* * * * *